United States Patent
Hoffrogge et al.

(10) Patent No.: US 12,510,644 B2
(45) Date of Patent: Dec. 30, 2025

(54) ULTRASONIC MICROSCOPE AND CARRIER FOR CARRYING AN ACOUSTIC PULSE TRANSDUCER

(71) Applicant: PVA TePla Analytical Systems GmbH, Westhausen (DE)

(72) Inventors: Peter Hoffrogge, Oberkochen (DE); Martin Böckler, Wettringen (DE); Mario Lowack, Neuburg an der Kammel (DE); Matthias Koch, Aalen (DE); Martin Hinderer, Schwäbisch Hall (DE); Markus Herrmann, Hüttlingen (DE); Tatjana Djuric-Rissner, Aalen (DE); Zyzi Ramos, Aalen (DE)

(73) Assignee: PVA TEPLA ANALYTICAL SYSTEMS GMBH, Westhausen (DE)

( * ) Notice: Subject to any disclaimer, the term of this patent is extended or adjusted under 35 U.S.C. 154(b) by 596 days.

(21) Appl. No.: 15/989,428

(22) Filed: May 25, 2018

(65) Prior Publication Data

US 2019/0361103 A1    Nov. 28, 2019

(51) Int. Cl.
*G01S 7/52* (2006.01)
*G01S 15/89* (2006.01)
*H01L 21/67* (2006.01)

(52) U.S. Cl.
CPC ........ *G01S 7/52085* (2013.01); *G01S 7/5202* (2013.01); *G01S 7/52025* (2013.01);
(Continued)

(58) Field of Classification Search
None
See application file for complete search history.

(56) References Cited

U.S. PATENT DOCUMENTS

| | | | |
|---|---|---|---|
| 3,448,606 A * | 6/1969 | Clark | A61B 6/4417 600/440 |
| 3,654,596 A * | 4/1972 | Osepchuk | H01J 31/495 367/7 |

(Continued)

FOREIGN PATENT DOCUMENTS

| | | |
|---|---|---|
| CN | 103308607 | 9/2013 |
| CN | 103926315 A | 7/2014 |

(Continued)

OTHER PUBLICATIONS

Dogan, Hülya, Selen Ayas, and Murat Ekinci. "Auto-focusing with multi focus color image fusion based on curvelet transform on microscopic imaging." 2015 9th International Conference on Electrical and Electronics Engineering (ELECO). IEEE, 2015. (Year: 2015).*

(Continued)

*Primary Examiner* — Isam A Alsomiri
*Assistant Examiner* — Jonathan D Armstrong
(74) *Attorney, Agent, or Firm* — Scully, Scott, Murphy & Presser, P.C.

(57) ABSTRACT

The invention relates to an ultrasonic microscope for inspecting an object, comprising an object holder for holding the object in an object region; a scan head; a first transducer supported by the scan head and configured to emit first acoustic pulses along an emission direction, to focus the first acoustic pulses in a focal point, to detect second acoustic pulses emerging from the object and to output a first detection signal representing the second acoustic pulses detected by the first transducer; a first actuator configured to move the first transducer relative to the scan head along a vertical direction which is essentially parallel to the emission direction; and a controller configured to control the first actuator based on the first detection signal. Further, the invention relates to a carrier for carrying an (Continued)

acoustic pulse transducer of an ultrasonic microscope within an immersion liquid.

25 Claims, 8 Drawing Sheets

(52) U.S. Cl.
CPC ...... *G01S 7/52079* (2013.01); *G01S 15/8938* (2013.01); *H01L 21/67288* (2013.01)

(56) References Cited

U.S. PATENT DOCUMENTS

| | | | | |
|---|---|---|---|---|
| 3,774,717 | A * | 11/1973 | Chodorow | G01N 29/032 |
| | | | | 73/61.75 |
| 3,790,281 | A * | 2/1974 | Kessler | G01N 29/0609 |
| | | | | 356/72 |
| 4,011,748 | A * | 3/1977 | Bond | G01H 3/125 |
| | | | | 73/601 |
| 4,030,342 | A * | 6/1977 | Bond | G01H 3/125 |
| | | | | 73/627 |
| 4,366,713 | A * | 1/1983 | Gilmore | G01N 29/11 |
| | | | | 73/588 |
| 4,430,897 | A * | 2/1984 | Quate | G01H 3/125 |
| | | | | 374/5 |
| 4,541,281 | A * | 9/1985 | Chubachi | G01H 3/125 |
| | | | | 73/602 |
| 4,655,083 | A * | 4/1987 | Chubachi | G01N 29/06 |
| | | | | 73/606 |
| 4,674,333 | A * | 6/1987 | Jindo | G01H 3/125 |
| | | | | 73/606 |
| 4,741,212 | A * | 5/1988 | Rehwald | G01H 3/125 |
| | | | | 73/600 |
| 5,019,993 | A * | 5/1991 | Montalcini | G05B 19/4207 |
| | | | | 702/159 |
| 5,319,977 | A * | 6/1994 | Quate | G01Q 60/32 |
| | | | | 73/620 |
| 5,551,295 | A * | 9/1996 | Stockburger | A61B 5/1172 |
| | | | | 356/71 |
| 6,337,474 | B1 * | 1/2002 | Morizono | G02B 21/002 |
| | | | | 250/208.1 |
| 6,449,048 | B1 * | 9/2002 | Olszak | G01B 11/2441 |
| | | | | 356/497 |
| 6,865,948 | B1 * | 3/2005 | Chen | G01N 21/9503 |
| | | | | 250/559.42 |
| 8,007,439 | B2 * | 8/2011 | Specht | A61B 8/08 |
| | | | | 600/459 |
| 8,794,072 | B2 | 8/2014 | Kessler et al. | |
| 9,474,494 | B2 | 10/2016 | Frochaux | |
| 10,241,085 | B2 | 3/2019 | Kessler et al. | |
| 2002/0157470 | A1 | 10/2002 | Noetzel et al. | |
| 2003/0023393 | A1 * | 1/2003 | Oravecz | G01N 29/0609 |
| | | | | 702/39 |
| 2003/0041657 | A1 * | 3/2003 | Degertekin | B82Y 35/00 |
| | | | | 73/105 |
| 2004/0223632 | A1 * | 11/2004 | Olszak | G02B 21/244 |
| | | | | 382/128 |
| 2004/0256538 | A1 * | 12/2004 | Olson | G02B 21/002 |
| | | | | 250/201.3 |
| 2005/0229707 | A1 * | 10/2005 | Oravecz | G01N 29/0609 |
| | | | | 73/589 |
| 2006/0288786 | A1 | 12/2006 | Flores | |
| 2008/0122316 | A1 * | 5/2008 | Ue | H01L 41/0913 |
| | | | | 310/318 |
| 2009/0095086 | A1 * | 4/2009 | Kessler | G01N 29/265 |
| | | | | 73/606 |
| 2011/0000299 | A1 | 1/2011 | Isobe | |
| 2012/0314212 | A1 * | 12/2012 | Jang | H01L 22/12 |
| | | | | 356/239.3 |
| 2013/0076467 | A1 * | 3/2013 | Compter | F16C 32/0434 |
| | | | | 335/285 |
| 2015/0070708 | A1 | 3/2015 | Campagne | |
| 2015/0168701 | A1 * | 6/2015 | Gouch | G02B 21/006 |
| | | | | 359/383 |
| 2016/0103443 | A1 * | 4/2016 | Bryll | G02B 21/0016 |
| | | | | 700/114 |
| 2018/0113096 | A1 | 4/2018 | Appel | |
| 2018/0128782 | A1 * | 5/2018 | Keeton | G01N 29/0681 |
| 2019/0331757 | A1 * | 10/2019 | Motzer | G01N 29/2418 |
| 2020/0124723 | A1 * | 4/2020 | Strohm | G01N 29/38 |

FOREIGN PATENT DOCUMENTS

| | | | | |
|---|---|---|---|---|
| FR | 2660436 | A1 | 10/1991 | |
| JP | S6091256 | A | 5/1985 | |
| JP | 61210943 | A | 9/1986 | |
| JP | S61210943 | A | 9/1986 | |
| JP | 04369407 | A * | 12/1992 | |
| JP | 2003-106976 | | 4/2003 | |
| JP | 2006058029 | A | 3/2006 | |
| JP | 2008046096 | A | 2/2008 | |
| JP | 2009145324 | A | 7/2009 | |
| JP | 06091256 | B2 | 3/2017 | |
| JP | 2017053871 | A | 3/2017 | |
| JP | 2019203779 | A | 11/2019 | |
| KR | 10-0845005 | | 7/2008 | |
| KR | 2011-0014272 | | 2/2011 | |
| TW | 201623958 | A | 7/2016 | |
| WO | WO-9204628 | A1 * | 3/1992 | G01S 7/52033 |

OTHER PUBLICATIONS

Li, Q., K-S. Kim, and A. Rydberg. "Lateral force calibration of an atomic force microscope with a diamagnetic levitation spring system." Review of scientific instruments 77.6 (2006): 065105. (Year: 2006).*
Kanai, Hiroshi, Noriyoshi Chubachi, and Toshio Sannomiya. "Microdefocusing method for measuring acoustic properties using acoustic microscope." IEEE transactions on ultrasonics, ferroelectrics, and frequency control 39.5 (1992): 643-652. (Year: 1992).*
International Search Report for Application No. PCT/EP2019/062834, dated Nov. 25, 2019, 21 pages.
Gopalan et al.: "A high-speed digital peak detector and averager for acoustic microscopy", Apr. 25, 1989, pp. 54-56, XP010085071.
"Semiconductor devices—Mechanical and climatic test methods—Part 35: Acoustic microscopy for plastic encapsulated electronic components", IEC 60749-35:2006, Jul. 18, 2006, pp. 1-43, XP082004904.
Invitation to Pay Additional Fees and Partial Search Report for Application No. PCT/EP2019/062834, mailing date Aug. 19, 2019, 13 pages.
Taiwanese Office Action dated Nov. 2, 2023, Corresponding to Application No. 11221097760, pp. 1-13.
Japanese Office Action dated Jun. 8, 2023, Corresponding to Application No. 288902, pp. 1-9.
F.E. Gueuning, et al., "Accurate Distance Measurement by an Autonomous Ultrasonic System Combining Time-of-Flight and Phase-Shift Methods," IEEE Transactions on Instrumentation and Measurement, vol. 46, No. 6, Dec. 1997, pp. 1236-1240.

* cited by examiner

ULTRASONIC MICROSCOPE AND CARRIER FOR CARRYING AN ACOUSTIC PULSE TRANSDUCER

FIELD

The present invention relates to an ultrasonic microscope for inspecting an object, in particular for inspecting a semiconductor structure. Further, the present invention relates to a carrier for carrying an acoustic pulse transducer of an ultrasonic microscope.

BACKGROUND

Ultrasonic microscopes are used for the non-destructive inspection of objects such as materials and devices. Due to the capability of non-destructive inspection, such ultrasonic microscopes are advantageously applied in the field of quality monitoring, reliability studies, optimization and failure analysis. For example, in semiconductor fabrication, ultrasonic microscopes are used for inspection of finished and partly processed semiconductor devices. Delamination, voids, cracks or inclusions of the objects may be detected and their mechanical properties determined by use of such ultrasonic microscopes.

Inspection of an object by use of an ultrasonic microscope may be performed by directing acoustic pulses, in particular ultrasonic pulses, to the object and analyzing acoustic pulses reflected by the object and/or transmitted through the object. Basis for this analysis is the physical phenomenon that acoustic pulses are partially reflected and partially transmitted at each acoustic interface of the object. Therefore, an object comprising a plurality of different material layers produces a plurality of reflected pulses from a single acoustic pulse directed onto the object. The plurality of reflected acoustic pulses is detected by an acoustic transducer outputting a time-domain signal representing the intensity of the reflected acoustic pulses. Based on the time delay of each of the plurality of reflected pulses relative to the pulse directed onto the object, the depth of the material layer within the object can be determined. Further, based on the intensity of the reflected acoustic pulses, the kind of material may be deduced whereby defects in the object can be determined.

SUMMARY OF THE INVENTION

The object of the present invention is to provide an ultrasonic microscope capable of inspecting an object with high accuracy as quick as possible. Objects to be inspected may be materials and devices, in particular wafers, packages, components or devices made using semiconductor materials. The surface geometry of the object may be uneven with respect to the size of the object.

According to an aspect of the present invention, an ultrasonic microscope for inspecting an object comprises an object holder configured to hold the object in an object region; a scan head movable relative to the object region; a first transducer supported by the scan head wherein the first transducer is configured to emit first acoustic pulses along an emission direction and to focus the first acoustic pulses in a focal point and wherein the first transducer is further configured to detect second acoustic pulses emerging from the object and to output a first detection signal representing the second acoustic pulses detected by the first transducer.

According to this aspect, the scan head supports the first transducer. By moving the scan head relative to the object region, the first transducer is also moved relative to the object region.

The first transducer is configured to emit first acoustic pulses, in particular ultrasonic pulses along the emission direction whereby the first acoustic pulses are directed onto the object in the object region. The first acoustic pulses are focused in the focal point and the object may be placed relative to the focal point so that a location of interest of the object coincides with the focal point.

The first transducer is further configured to detect the second acoustic pulses which emerge from the object upon the first acoustic pulses being directed onto the object. The first transducer is further configured to generate from the detected acoustic pulses the first detection signal which is output by the first transducer. For example, the first detection signal may be a time-domain signal representing the time-dependent intensity of the second acoustic pulses.

According to an embodiment, the ultrasonic microscope further comprises a first actuator configured to move the first transducer relative to the scan head along a vertical direction which is essentially parallel to the emission direction; and a controller configured to control vertical movement of the first transducer relative to the scan head provided by the first actuator based on the first detection signal.

The first actuator is configured to move the first transducer relative to the scan head along the vertical direction. Thereby the focal point is also moved relative to the scan head along the vertical direction. Accordingly, the focal point may be translated along the vertical direction by the first actuator in that the first actuator moves the first transducer relative to the scan head along the vertical direction. The controller is configured to control the vertical movement of the first transducer relative to the scan head provided by the first actuator based on the first detection signal, i.e. based on the second acoustic pulses emerging from the object upon the first acoustic pulses being directed to the object. Therefore, the focal point can be positioned relative to the object and relative to the scan head based on the first detection signal.

According to an embodiment, the controller is further configured to control emission of the first acoustic pulses by the first transducer, determine a distance value representing a distance between the first transducer and the object based on the first detection signal, and control the vertical movement of the first transducer relative to the scan head provided by the first actuator based on the determined distance value. For example, the distance between the first transducer and the object may be calculated by the controller based on the time of flight of one of the first acoustic pulses from the first transducer to the object and based on the time of flight of a second acoustic pulse generated by the one first acoustic pulse from the object to the first transducer. The calculation may make use of parameters such as the sonic speed in air or an immersion liquid and the like.

According to this embodiment, the controller is configured to cause the first transducer to emit the first acoustic pulses. Accordingly, the controller controls the timings at which the first transducer emits the first acoustic pulses. Further, the controller is configured to obtain the first detection signal from the first transducer after the first acoustic pulses were directed onto the object. Accordingly, the controller may be configured to determine the timings at which the second acoustic pulses emerging from the object reached the first transducer. Based on the timings of the emission of the first acoustic pulses and the reception of the second acoustic pulses, the controller may be configured to calculate the distance between the first transducer and the object, in particular determine the distances between the first transducer and a plurality of material layers in a semiconductor structure. Based on the determined distance value(s), the controller can control the vertical movement of the first transducer relative to the scan head provided by the first actuator so that the focal point is positioned at a desired position relative to the object.

For example, the controller may be configured to control the vertical movement of the first transducer relative to the scan head provided by the first actuator based on the determined distance value(s) so that the distance between the first transducer and the object approaches a predefined working distance.

For example, the controller may be configured to control the vertical movement of the first transducer relative to the scan head provided by the first actuator so that the predefined working distance is maintained between the first transducer and the object while the scan head moves the first transducer relative to the object region. As a particular example, the controller may be configured to control the vertical movement of the first transducer relative to the scan head provided by the first actuator so that the predefined working distance is maintained between the first transducer and a surface of the object while the scan head moves the first transducer relative to the object region.

According to another embodiment, the controller may be configured to determine a defocusing value representing a distance between the focal point and a location of interest of the object based on the determined distance value, and control the vertical movement of the first transducer relative to the scan head provided by the first actuator based on the defocusing value.

For example, a plurality of locations of interest of the object may be defined by a user to be located a predefined distance below the surface of the object. As described above, the distance between the first transducer and the surface of the object can be determined by the controller. Accordingly, the controller can be configured to determine the distance of the locations of interest of the object from the first transducer based on the user-defined predefined distance and the distance value. Further, the focal distance is also available to the controller, i.e. the distance between the focal point generated by the first transducer and the first transducer itself. Based on these data, the controller may be configured to determine the defocusing value representing the distance between the focal point and the locations of interest of the object. Accordingly, the controller may control the vertical movement of the first transducer relative to the scan head provided by the first actuator based on the defocusing value so that the focal point approaches/coincides with the locations of interest.

According to a further embodiment, the ultrasonic microscope further comprises a scan-head positioning device configured to move the scan head relative to the object holder in a lateral plane which is essentially orthogonal to the vertical direction.

According to this embodiment, the scan head can be moved relative to the object region by the scan-head positioning device in the lateral plane. This allows the controller to scan the object by moving the scan head relative to the object region while analyzing the object using the first transducer.

According to another embodiment, the controller comprises an analogue circuit configured to perform the controlling of the vertical movement of the first transducer relative to the scan head provided by the first actuator based on the first detection signal. Thereby, the vertical movement of the first transducer relative to the scan head may be performed at high speed with minimal delay caused by signal processing. Accordingly, the object may be scanned at high speed (i.e. the scan head is moved to a plurality of locations with respect to the object while the first transducer outputs the first detection signal) while the first acoustic pulses remain focused appropriately because of the high speed control of the vertical movement of the first transducer relative to the scan head.

According to another embodiment, the controller comprises a digital circuit for performing various operations disclosed herein.

According to another embodiment, the controller is further configured to determine a height profile of the object based on the first detection signal, wherein "height profile" denotes the object's extent in the vertical direction in dependence of one or more lateral directions. For example, in the ultrasonic microscope configured to determine a distance value representing a distance between the first transducer and the object based on the first detection signal, the controller may be configured to determine the height profile in a reference system of the first transducer based on the distance value. The height profile in the reference system of the first transducer may further be transformed into a height profile in another reference system. For example, the height profile in the reference system of the first transducer may be transformed into a reference system of the scan head by further using information about the vertical position of the first transducer relative to the scan head, i.e. an information about the vertical position of the first transducer in the reference system of the scan head. The information about the vertical position of the first transducer relative to the scan head may be obtained from a control signal provided to the first actuator by the controller wherein the control signal represents the vertical movement to be performed by the first actuator. Alternatively or additionally, the information about the vertical position of the first transducer relative to the scan head may be obtained by a measurement unit measuring the vertical position of the first transducer relative to the scan head and outputting a corresponding signal.

As a first example, the controller may be configured to control the vertical movement of the first transducer relative to the scan head. Accordingly, the vertical position of the first transducer relative to the scan head during scanning of the object using the scan head positioning device is available to the controller by way of the control signal. Further, during scanning of the object using the scan head positioning device, the distance in the vertical direction between the first transducer and the object may be determined as described above. Based on the vertical position of the scan head and the distance in the vertical direction between the first transducer and the object, the controller can determine the height profile of the object in the reference system of the scan head and the reference system of the scan head positioning device.

As a second example, the controller may be configured to control the vertical movement of the first transducer relative to the scan head provided by the first actuator so that a predefined working distance is maintained between the first transducer and a surface of the object while the object is scanned in a lateral direction. In this example, the distance between the surface of the object and the first transducer remains essentially constant (at the level of the predefined working distance) so that the height profile may be derived directly from the control signal.

According to another embodiment, the controller is further configured to control the scan-head positioning device so that the scan head is positioned at a plurality of positions. Each time the scan head is positioned at one of the plurality of positions, the controller causes the first transducer to emit at least one of the first acoustic pulses, to detect at least one of the second acoustic pulses and to output the first detection signal. The controller is further configured to store the first detection signals or values derived therefrom in association with the plurality of positions and to control the vertical movement of the first transducer relative to the scan head provided by the first actuator based on a set of the stored first detection signals or values derived therefrom.

According to this embodiment, the controller is configured to control the scan-head positioning device so that the scan head is positioned at the plurality of positions. That is, the controller causes the scan-head positioning device to move the scan head, and thus the first transducer, to be positioned at the plurality of positions. For example, the scan-head positioning device may be caused to move along a path such as one or more lines relative to the object region so that a plurality of locations of the object may be analyzed along the path.

At each of the plurality of positions of the scan head, the controller causes the first transducer to emit at least one of the first acoustic pulses, to detect at least one of the second acoustic pulses and to output the first detection signal. That is, each time the scan head is positioned at one of the plurality of positions, a location of the object is analyzed by directing at least one of the first acoustic pulses to the object and detecting the second acoustic pulses emerging from the object whereby the first detection signal is output at least once at each of the plurality of positions of the scan head. Therefore, a plurality of the first detection signals is obtained while moving the scan head to the plurality of positions/ along the path.

The plurality of the first detection signals or values derived therefrom, such as the above-mentioned distance value or the defocusing value, are stored by the controller in association with the plurality of positions of the scan head (or in association with the plurality of locations of the object). Accordingly, for each of the plurality of positions of the scan head (or for each of the plurality of the locations of the object), one of the plurality of detection signals or values derived therefrom is available in the memory for controlling the first actuator.

For example, first detection signals or values derived therefrom may have been obtained by the procedure described above and stored in the memory for a first set of positions of the scan head (or a first set of locations of the object). Before moving the scan head to a second position different from each position of the first set of positions of the scan head (or different from each position of the first set of locations of the object), the controller may calculate a prediction value for controlling the vertical movement of the first transducer relative to the scan head provided by the first actuator based on the first detection signals or values derived therefrom stored in the memory. Accordingly, even before moving the scan head to the second position where the object may not have been analyzed before, the first actuator may already be controlled according to the prediction value. Thereby, the first transducer can be brought into or close to the predefined working distance or the defocusing value may already be fairly small before/while the scan head is being moved to the second position. This reduces the amount of time required to properly arrange the first transducer with respect to the object when the object is scanned.

According to a further embodiment therein, for determining the prediction value for controlling the first actuator for a second position of the scan head, a sub-set of the detection signals or values derived therefrom stored in the memory may be used. The sub-set may be selected by the controller based on the distance between the second position and each of the first positions associated with one of the first detection signals/values derived therefrom. For example, the sub-set may be defined as to include the first detection signals/ values derived therefrom associated with first positions, each having a distance to the second position which is less than a predefined threshold distance value. The predefined threshold distance value may be less than 1 μm, in particular less than 100 nm, or less than 10 nm. According to this embodiment, the first detection signals of values derived therefrom previously obtained at positions of the scan head that are close to the second position where the object is analyzed next are used for controlling the first actuator. For determining the prediction value, the sub-set may be processed using, for example, interpolation, extrapolation, etc.

For example, the object may first be scanned coarsely whereby a coarse height profile of the object may be determined. The coarse height profile of the object may then be used for controlling the vertical movement of the first transducer relative to the scan head in the vertical direction provided by the first actuator when the object is fine-scanned. For example, a prediction value for the height of the object at a particular location on the surface of the object may be determined by the controller based on the coarse height profile, e.g. by using interpolation. Subsequently, when the scan head is moved to place the first transducer in a position for emitting first acoustic pulses to the particular location, the controller can already move the first transducer at an appropriate position in the vertical direction based on the prediction value for the particular location so that the first acoustic pulses are focused well when the scan head arrives at the place. Accordingly, the object can be scanned quickly.

In order to improve the dynamic behavior of the first transducer in the vertical direction (i.e. movement of the first transducer relative to the scan head provided by the first actuator), a weight compensation device may be provided which compensates the weight of the first transducer. For example, a magnetic spring may be provided which compensates the force acting on the first actuator due to the weight of the first transducer. By means of the weight compensation device the effective mass to be moved by the first actuator is minimized which results in improved dynamic behavior of the first transducer. In particular, the first transducer may be accelerated and deaccelerated more quickly as compared to the case in which no weight compensation device is used. Another advantage of the weight compensation device is that the dynamic behavior of the first transducer is essentially the same for both of the vertical directions (up and down) and thus controlling of the dynamic behavior of the first transducer by means of the first actuator can be simplified.

According to another embodiment, the ultrasonic microscope further comprises a second transducer supported by the scan head so that the object region is located between the first transducer and the second transducer, wherein the second transducer is configured to detect the second acoustic pulses emerging from the object and to output a second detection signal representing the second acoustic pulses detected by the second transducer.

According to this embodiment, the first and the second transducer are provided in the ultrasonic microscope whereby the second acoustic pulses reflected from the object may be detected by the first transducer whereas the second acoustic pulses transmitted through the object may be detected by the second transducer. This allows to inspect the object more accurately.

According to another embodiment therein, the ultrasonic microscope may further comprise a second actuator configured to move the first transducer relative to the scan head along a lateral direction which is essentially orthogonal to the vertical direction, and wherein the controller is further configured to control lateral movement of the first transducer relative to the scan head provided by the second actuator based on the second detection signal.

While the first actuator described above is configured to move the first transducer relative to the scan head along the vertical direction, the second actuator is configured to move the first transducer relative to the scan head along the lateral direction which is essentially orthogonal to the vertical direction and which is in particular orthogonal to the vertical direction. By moving the first transducer relative to the scan head in the lateral direction, the first transducer emitting the first acoustic pulses and the second transducer detecting the second acoustic pulses transmitted through the object may be aligned relative to each other along the lateral direction. For example, the controller may be configured to control the lateral movement of the first transducer relative to the scan head provided by the second actuator based on the second detection signal so that an intensity of the second detection signal is maximized. When the intensity of the second detection signal is maximized, it may be assumed that the focal point of the first acoustic pulses generated by the first transducer coincides with a focal point of the second transducer for detecting the second acoustic pulses in the lateral direction. This improves the signal to noise ratio of the second detection signal and, thus, the accuracy of the inspection of the object.

In addition or alternatively, the controller may be configured to calculate a frequency-domain representation of the second detection signal and to control the lateral movement of the first transducer relative to the scan head provided by the second actuator based on the frequency-domain representation of the second detection signal. In particular, the frequency-domain amplitude distribution of the second detection signal and the bandwidth of the second detection signal may be suitable quantities for the alignment so that the controller may be configured control the lateral movement of the first transducer relative to the scan head provided by the second actuator based on the frequency-domain amplitude distribution of the second detection signal and/or the bandwidth of the second detection signal. As a specific example, coarse alignment of the first transducer relative to the second transducer in the lateral direction may be achieved by using the intensity of the second detection signal in the time-domain, whereas fine alignment may be achieved by using at least one of the frequency-domain representation of the second detection signal, the frequency-domain amplitude distribution of the second detection signal, and the bandwidth of the second detection signal.

According to another embodiment therein, the ultrasonic microscope may further comprise a third actuator configured to move the second transducer relative to the scan head along the vertical direction. Accordingly, the second transducer and, thus, the focal point for detecting the second acoustic pulses by the second transducer can be moved relative to the scan head and, thus, relative to the first transducer and its focal point, along the vertical direction by the third actuator. Accordingly, the focal point generated by the first transducer and the focal point generated by the second transducer may be brought into coincidence along the vertical direction by the controller controlling the vertical movement of the second transducer relative to the scan head provided by the third actuator. Further the vertical distance between the first transducer and the second transducer can be controlled by the controller configured to control the first and third actuators.

According to an embodiment therein, the third actuator is configured to control vertical movement of the second transducer relative to the scan head provided by the third actuator based on the first detection signal. Assuming that the controller is also configured to control vertical movement of the first transducer relative to the scan head provided by the first actuator, the controller may be configured to generate, based on the first detection signal, a control signal for controlling the vertical movement of the first transducer relative to the scan head provided by the first actuator. For example, the control signal may be generated so that a vertical distance between the object and the first transducer remains essentially constant during scanning of the object. The first detection signal and/or the control signal derived from the first detection signal may be used by the controller for controlling the vertical movement of the second transducer relative to the scan head provided by the third actuator. For example, the vertical distance between the first transducer and the second transducer may be maintained at a predetermined value during scanning of the object. For example, the controller may be configured to control the vertical movement of the first and second transducers provided by the first and third actuators, respectively, based on the first detection signal (and/or the control signal) so that the distance between the first transducer and the second transducer remains essentially constant during scanning of the object. This is particularly useful when the object is composed of at least one layer and is slightly bent. While the controller controls the vertical movement of the first transducer provided by the first actuator so that the first acoustic pulses remain focused on the surface of the object (or another predefined path relative thereto) during scanning of the object, the distance between the first and second transducers is maintained essentially constant (by controlling the third transducer based on the first detection signal or the control signal) so that the focal points of both the first and second transducers essentially coincide during scanning of the object.

Additionally or alternatively, the controller may be configured to control vertical movement of the second transducer relative to the scan head provided by the third actuator based on the second detection signal. For example, the controller may be configured to control the third actuator so that an intensity of the second detection signal is maximized. When the intensity of the second detection signal is maximized, it may be assumed that the focal point generated by the first transducer and the focal point generated by the second transducer coincide with respect to the vertical direction. Thus, the signal to noise ratio of the second detection signal can be improved which improves the accuracy of the inspection of the object.

In addition or alternatively, the controller may be configured to calculate a frequency-domain representation of the second detection signal and to control the vertical movement of the second transducer relative to the scan head provided by the third actuator based on the frequency-domain representation of the second detection signal. In particular, the frequency-domain amplitude distribution of the second detection signal and the bandwidth of the second detection signal may be suitable quantities for the alignment so that the controller may be configured control the vertical movement of the second transducer relative to the scan head provided by the third actuator based on the frequency-domain amplitude distribution of the second detection signal and/or the bandwidth of the second detection signal. As a specific example, coarse alignment of the first transducer relative to the second transducer in the vertical direction may be achieved by using the intensity of the second detection signal in the time-domain, whereas fine alignment may be achieved by using at least one of the frequency-domain representation of the second detection signal, the frequency-domain amplitude distribution of the second detection signal, and the bandwidth of the second detection signal.

According to another embodiment, the ultrasonic microscope further comprises a fourth actuator configured to move the object holder relative to the scan head along the vertical direction, and wherein the controller is further configured to control the fourth actuator so that the object can be variably positioned relative to the focal point generated by the first actuator in the vertical direction.

According to this embodiment, the fourth actuator is provided to move the object holder relative to the scan head and, thus, relative to the focal point of the first acoustic pulses generated by the first transducer. While the positioning of the first transducer and the second transducer relative to each other and, thus, the positioning of the focal point generated by the first transducer and the focal point generated by the second transducer relative to each other are maintained, the positioning of the focal point generated by the first transducer relative to the object may be variably set using the fourth actuator moving the object holder relative to the scan head along the vertical direction. Accordingly, the location of the object to be analyzed may be easily altered using the fourth actuator while the alignment of the first transducer and the second transducer is maintained. This provides an effective way for setting the location of the object to be analyzed along the vertical direction without additional overhead with respect to the controlling of the first and second transducers. Note that the location of the object to be analyzed along the lateral direction may also be easily changed while maintaining the relative positioning of the first and second transducers by the scan-head positioning device which is configured to move both, the first and second transducers, relative to the scan head along the lateral direction.

According to another embodiment, the scan-head positioning device is configured to displace the scan head at most by a first displacement value, wherein the second actuator is configured to displace the first transducer relative to scan head at most by a second displacement value, and wherein a ratio of the first displacement value to the second displacement value is at least 10, in particular at least 100 or at least 1000.

According to this embodiment, both the scan-head positioning device and the second actuator are configured to perform movements in the lateral direction. In particular, the scan-head positioning device is configured to move the scan head relative to the object region in the lateral direction whereas the second actuator is configured to move the first transducer relative to the scan head in the lateral direction. The first displacement value is much larger than the second displacement value. Accordingly, the scan-head positioning device is used for large displacements of the entire scan head with respect to the object while the second actuator is used for small displacements such as the alignment of the first and second transducers.

According to another embodiment, the ultrasonic microscope may further comprise an immersion apparatus configured to provide an incessant connection of an immersion liquid between the first transducer and the object. In embodiments in which the ultrasonic microscope also comprises the second transducer, the immersion apparatus may be further configured to provide an incessant connection of the immersion liquid between the second transducer and the object.

The immersion liquid may be liquid near room temperature, e.g. at 20° C. The immersion liquid may comprise at least one of water, oil, liquid metals and liquid metal alloys.

The incessant connection of the immersion liquid between the first transducer and the object and the second transducer and the object, respectively, allows to obtain a greater numerical aperture for generating the respective focal points and thus improves the resolution.

Different kinds of immersion apparatuses may be used. For example, the immersion apparatus may comprise a jet generation device wherein the jet generation device may be configured to generate a first incessant jet of the immersion liquid between the first transducer and the object (object region) and/or a second incessant jet of the immersion liquid between the second transducer and the object (object region). The jet generation device may be attached to the scan head. While the jet generation device adds complexity to the ultrasonic microscope, neither the first transducer nor the second transducer must be moved within a bath of the immersion liquid as is known in the related art. Moving the first and/or second transducer within a bath of the immersion liquid generally reduces the speed by which the first and/or second transducer can be moved relative to the object. Further, by avoiding the necessity to move the first and/or second transducers in a bath of the immersion liquid, the problem of fluid resistance (drag) may be avoided.

According to another example, the immersion apparatus may comprise a receptacle for containing the immersion liquid. The receptacle may be filled with the immersion liquid so that the object region is partially located within the immersion liquid. That is, the receptacle may be filled with the immersion liquid so that an object in the object region is partially located within the immersion liquid.

In this example, assuming that the first transducer is located in the vertical direction above the object region and that the second transducer is located in the vertical direction below the object region, the second detection pulses detected by the second transducer propagate in a bath of immersion liquid defined by the receptacle. This example may be improved by providing the above-described jet generation device configured to generate the first incessant jet of the immersion liquid between the first transducer and the object. Still further improvement of the example can be achieved by further providing the above-described jet generation device configured to generate the second incessant jet of the immersion liquid between the second transducer and the object whereby micro (air) bubbles between the second transducer and the object can be removed.

According to jet another example, the receptacle may be filled with immersion liquid so that the first transducer above the object region is at least partially located within immersion liquid, i.e. within the bath of immersion liquid provided by the receptacle. According to this example, no jet generation device is required because both the first and the second transducers are at least partially located within the immersion liquid contained in the receptacle. However, the immersion apparatus may still comprise the jet generation device described above for removing micro (air) bubbles within the immersion liquid between the first and/or second transducer and the object.

According to another embodiment, the first transducer is disposed above the object region. In an example of this embodiment, the first transducer is disposed, in the vertical direction, above the object region and, thus, above an object locatable in the object region. The vertical direction is defined as a direction which is essentially parallel to the emission direction of the first acoustic pulses. However, the vertical direction may also be defined as a direction which is essentially antiparallel to the direction of the gravitational force of the ultrasonic microscope.

According to another embodiment, the first transducer is configured to emit the first acoustic pulses so that the first acoustic pulses have an acoustic frequency above a threshold frequency, wherein the threshold frequency is selected from a group of threshold frequencies and the group of threshold frequencies comprises 10 MHz and 15 MHz.

According to another aspect of the present invention, a carrier for carrying an acoustic pulse transducer of an ultrasonic microscope within an immersion liquid is provided wherein the carrier comprises a first portion to be located within the immersion liquid and a second portion to be located outside the immersion liquid, wherein the first portion comprises a solid structure having openings allowing the immersion liquid to flow through the first portion, wherein a first value represents a total area of the openings in a cross section of the first portion, wherein a second value represents a total area of the solid structure in the cross section of the first portion and wherein a ratio of the first value to the second value is greater than 5, in particular greater than 10, more in particular greater than 20.

The carrier described above may be used for carrying an acoustic pulse transducer of one of the ultrasonic microscopes defined above. For example, in the embodiment of the ultrasonic microscope described above in which the first transducer is located in the vertical direction above the object region and the second transducer is located in the vertical direction below the object region and a receptacle is provided and filled with the immersion liquid up to the object region, the second transducer is moved in the immersion liquid when the scan head is moved relative to the object region. Therefore, drag acts on the second transducer and the carrier carrying the second transducer. That is, the second transducer is supported by the scan head by means of the carrier. The above described carrier provides for a minimized drag due to the openings in the solid structure of the first portion of the carrier. These openings allow the immersion liquid to flow through the carrier, in particular through the first portion of the carrier. Accordingly, the drag acting on the carrier when moving the carrier within the immersion liquid is minimized by the above described structure of the carrier. Accordingly, the second transducer and the carrier may be quickly moved through the immersion liquid which allows for a quick inspection of the object.

The first portion of the carrier may have a length of at least 10 cm, in particular at least 30 cm in the cross section and may have a length of not more than 1 m, in particular not more than 60 cm, in the cross section. That is, a fairly long side of the carrier is represented in the cross section. In particular the cross section may be arranged orthogonal to a direction which is used for moving the scan head relative to the object region. For example, assuming that an object is inspected by scanning the object line by line, the cross section is selected so that the cross section is orthogonal to the direction of a line. Accordingly, the cross section represents a face of the carrier on which drag acts when the carrier is moved through the immersion liquid.

According to an embodiment, the solid structure of the carrier is shaped so that essentially no lift and/or drag is generated when the first portion is moved in the immersion liquid. In the terminology of the description of the ultrasonic microscope, the solid structure is shaped so that no force along the vertical direction acts on the carrier and the second transducer due to lift when the scan head is moved in the lateral direction.

BRIEF DESCRIPTION OF THE DRAWINGS

The forgoing as well as other advantageous features of the disclosure will be more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

Figure 1:
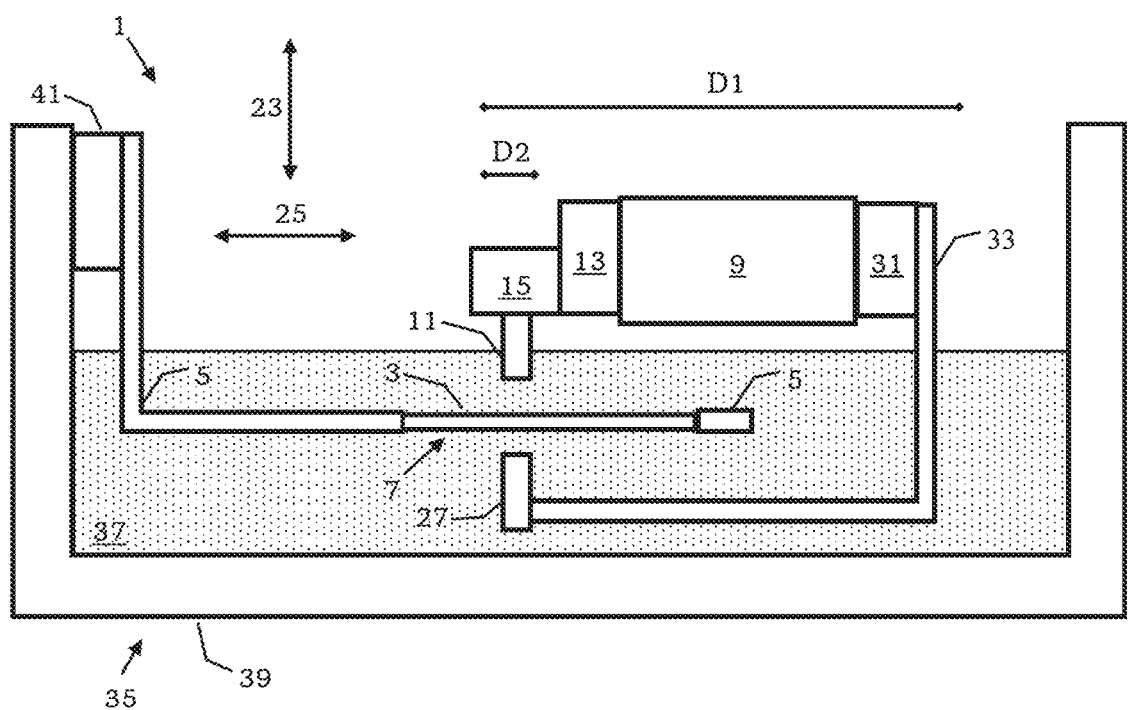
FIG. 1 schematically illustrates an ultrasonic microscope according to a first embodiment, FIG. 2 schematically illustrates the interaction of an ultrasonic microscope with an object.

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

FIG. 1 illustrates a first embodiment of an ultrasonic microscope 1 for inspecting an object 3. The ultrasonic microscope 1 comprises an object holder 5 configured to hold the object 3 in an object region 7. The ultrasonic microscope 1 further comprises a scan head 9 which is movable with respect to the object region 7. The ultrasonic microscope 1 further comprises a first transducer 11 supported by the scan head 9 by means of a first actuator 13 and a second actuator 15. The first transducer 11 is explained in more detail with reference to FIG. 2.

Figure 2:
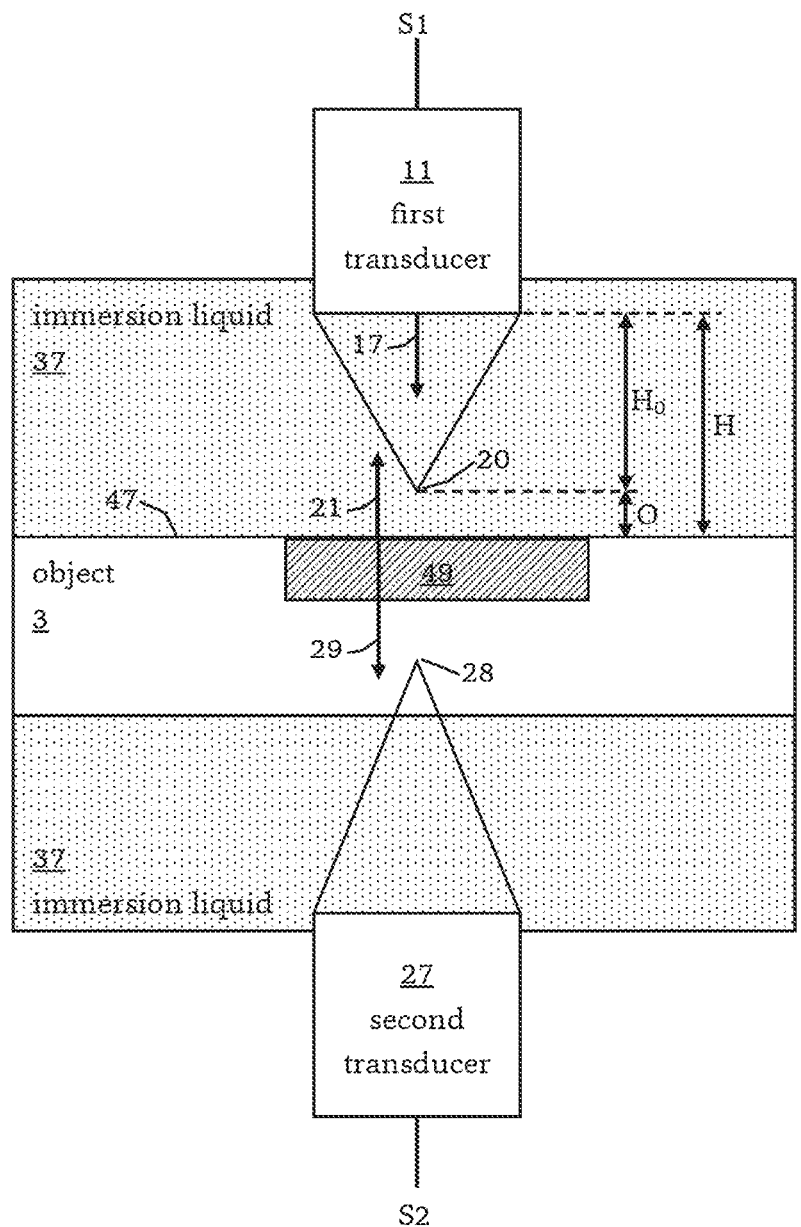

FIG. 2 schematically illustrates the interaction of the ultrasonic microscope 1 with the object 3. The first transducer 11 is configured to emit first acoustic pulses 17 (which are schematically illustrated by an arrow). The first transducer 11 emits the first acoustic pulses 17 along an emission direction which is represented by the direction of the arrow representing the first acoustic pulses. Further, the first transducer 11 focuses the first acoustic pulses 17 in a focal point 20 illustrated by the tip of a triangle.

When the first acoustic pulses are directed onto the object 3, second acoustic pulses emerge from the object 3. An example of a second acoustic pulse emerging from the object towards the first transducer is represented by an arrow 21. Such a second acoustic pulse may be (partially) reflected by the object.

The first transducer 11 is further configured to detect the second acoustic pulses emerging from the object 3. Further, the first transducer 11 is configured to output a first detection signal S1 representing the second acoustic pulses detected by the first transducer 11. The focal point 20 also applies for the detection section of the first transducer.

Referring again to FIG. 1, the first actuator 13 is configured to move the first transducer 11 relative to the scan head 9 along a vertical direction 23 indicated by an arrow. The vertical direction is essentially parallel to the emission direction of the first acoustic pulses. In particular, in the present example, the vertical direction is parallel to the emission direction of the first acoustic pulses.

The second actuator 15 is configured to move the first transducer 11 relative to the scan head 9 along a lateral direction 25 which is indicated by an arrow. The lateral direction is essentially orthogonal to the vertical direction.

The ultrasonic microscope 1 further comprises a second transducer 27 which is supported by the scan head 9 so that the object region 7 is located between the first transducer 11 and the second transducer 27. Referring to FIG. 2 again, the second transducer 27 is configured to detect the second acoustic pulses emerging from the object 3 towards the second transducer 27. An example of a second acoustic pulse transmitted through the object 3 towards the second transducer 27 is represented by an arrow 29. The second transducer 27 is further configured to output a second detection signal S2 representing the second acoustic pulses detected by the second transducer 27. The second transducer provides a focal point 28 for detection which is represented by the tip 28 of a triangle.

Referring again to FIG. 1, the second transducer 27 is supported by the scan head 9 by means of a third actuator 31 and a carrier 33. In particular, the second transducer 27 is rigidly connected to the carrier 33 which itself is supported by the scan head 9 by means of the third actuator 31. The third actuator 31 is configured to move the second transducer 27 relative to the scan head 9 along the vertical direction 23.

The ultrasonic microscope 1 further comprises an immersion apparatus 35 configured to provide an incessant connection of an immersion liquid 37 between the first transducer 11 and the object 3. Further, the immersion apparatus 35 is configured to provide an incessant connection of the immersion liquid 37 between the second transducer 27 and the object 3.

The immersion apparatus 35 comprises a receptacle 39 for containing the immersion liquid 37. The receptacle 39 provides a volume in which the immersion liquid 37 is held. Further, the receptacle 39 is configured and arranged so that the object region 7 and the second transducer 27 are located within said volume and so that the first transducer 11 is at least partially located within said volume. As the volume can be filled with the immersion liquid 37, the receptacle 39 provides an incessant connection between the object 3 and the first transducer 11 and an incessant connection between the object 3 and the second transducer 27.

The ultrasonic microscope 1 further comprises a fourth actuator 41 configured to move the object holder 5 relative to the scan head 9 along the vertical direction 23. By means of the fourth actuator 41, the object 3 can be simultaneously displaced relative to the first transducer 11 and the second transducer 27 which allows to easily set/change focus within the object in the vertical direction 23.

Figure 3:
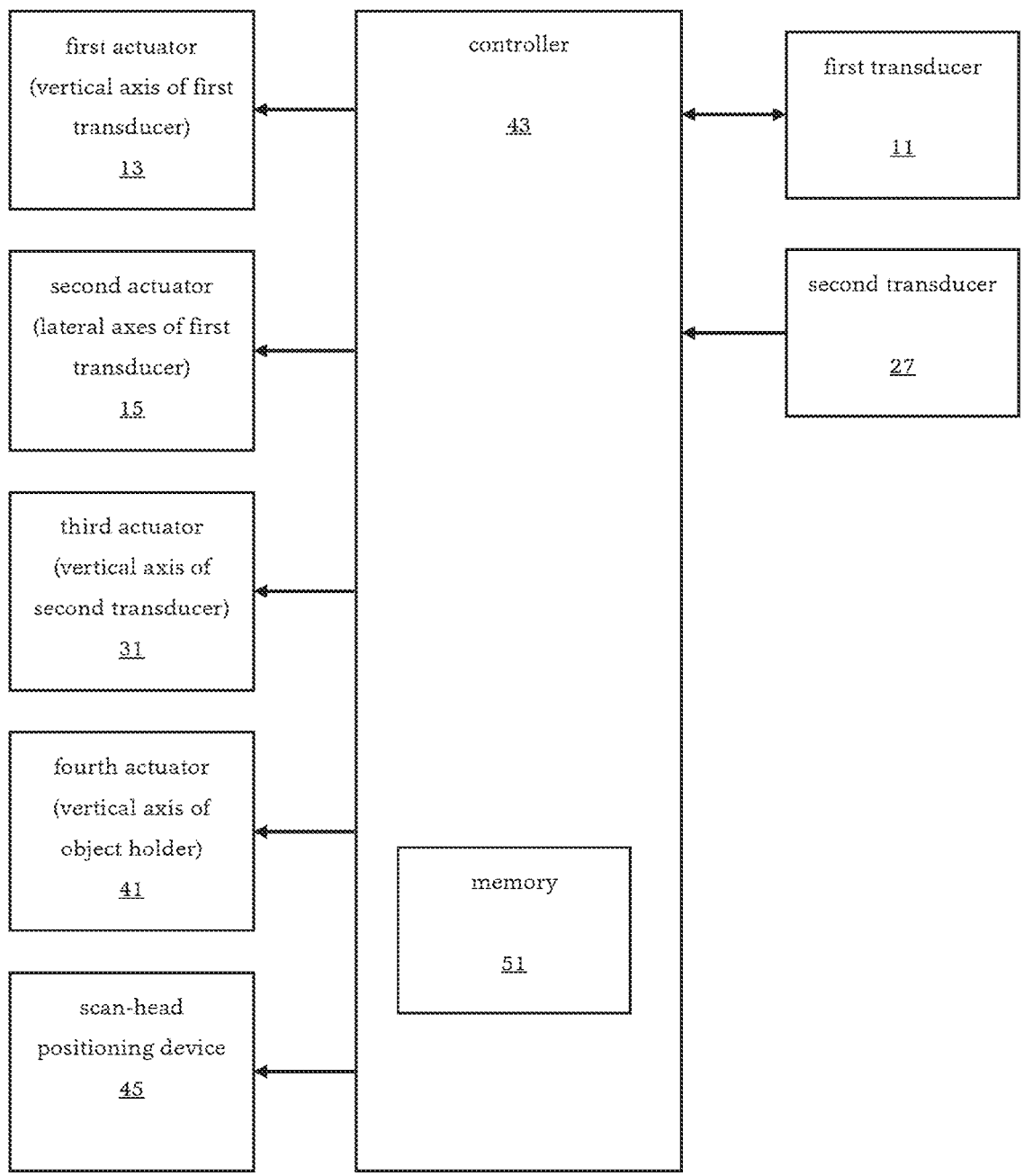
FIG. 3 illustrates a block diagram of components of the ultrasonic microscope according to the first embodiment, FIG. 4 schematically illustrates alignment of focal points generated by components of the ultrasonic microscope.

FIG. 3 illustrates a block diagram of components of the ultrasonic microscope 1. In particular, FIG. 3 illustrates the first actuator 13, the second actuator 15, the third actuator 31, and the fourth actuator 41 which are connected to a controller 43 of the ultrasonic microscope 1. Further, the first transducer 11 and the second transducer 27 are connected to the controller 43. The controller comprises a memory 51.

The ultrasonic microscope 1 further comprises a scan-head positioning device 45 connected to the controller 43. The scan-head positioning device is configured to move the scan head 9 relative to the object holder 5 and, thus, relative to the object 3 in a lateral plane which is essentially orthogonal to the vertical direction 23. Accordingly, the lateral plane is also indicated by numeral 25 in FIG. 1. For simplifying the drawing of FIG. 1, the scan-head positioning device 45 is not illustrated. However, the scan-head positioning device 45 is configured to move the scan head 9 and, thus, the first transducer 11 and the second transducer 27 in the lateral plane 25.

Referring again to FIG. 1, the scan-head positioning device 45 is configured to displace the scan head 9 at most by a first displacement value indicated by a distance D1. The second actuator 15 is configured to displace the first transducer 11 relative to the scan head 9 at most by a second displacement value indicated by a distance D2. A ratio of the first displacement value D1 to the second displacement value D2 may be, for example, at least 10. That is, the scan-head positioning device 45 can be used to displace the first transducer 11 relative to the object 3 by a large amount whereas the second actuator 15 can be used to displace the first transducer 11 relative to the object 3 by a small amount.

The configuration of the controller 43 is described in more detail below. The controller 43 is configured to control the first actuator 13 based on the first detection signal S1. In particular, referring to FIG. 2, the controller 43 may be configured to cause the first transducer 11 to emit the first acoustic pulses 17. A distance H between the first transducer 11 and the object 3, in particular between a surface 47 of the object 3 may be determined based on the propagation time of a first acoustic pulse from the first transducer 11 to the surface 47 and the propagation time of a (reflected) second acoustic from the surface 47 to the first transducer 11. That is, the distance H can be determined using the time of flight of an acoustic pulse emitted from the first transducer 11, reflected at the surface 47 and detected by the first transducer 11. Further parameters such as sonic velocity, a parameter describing the influence of a medium between the first transducer 11 and the object 3 (e.g. air or the immersion liquid 37) on the sonic velocity, a parameter describing the influence of material of the object 3 on the sonic velocity etc. may be stored in the memory 51 and used for determining the distance H. Accordingly, the controller 43 may be configured to determine a distance value representing the distance H and to control the first actuator 13 based on the determined distance value.

In particular, the controller 43 may be configured to control the first actuator 13 so that the distance H between the first transducer 11 and the object 3, in particular the distance between the first transducer 11 and the surface 47 of the object 3, approaches a predefined working distance $H_0$. In the example illustrated in FIG. 2, the predefined working distance $H_0$ is equivalent to the focal length of the first transducer 11, i.e. equivalent to the distance between the first transducer 11 and the focal point 20. This setup may be employed when the surface 47 of the object 3 is to be inspected where a particular analysis target 49 may be located.

As the controller 43 is configured to determine the distance value representing the distance H, the controller may be also configured to control the first actuator 13 to move the first transducer 11 relative to the scan head 9, and thus relative to the object 3, so that the distance H approaches the predefined working distance $H_0$.

Alternative to controlling the distance H to approach a predefined working distance $H_0$, the controller may be configured to determine a defocusing value representing a distance O between the focal point 20 and a location of interest of the object 3 based on the determined distance value H. In the example illustrated in FIG. 2, the location of interest coincides with the surface 47 of the object 3. However other locations within the object 3 may also be locations of interest.

For example, the controller 43 may store a value representing the focal length of the first transducer 11, i.e. the distance between the first transducer 11 and the focal point 20, in the memory 51. Based on said value and the previously determined distance value H, the controller may be configured to determine the defocusing value representing the distance O and to control the first actuator 13 based on the defocusing value.

Figure 4:
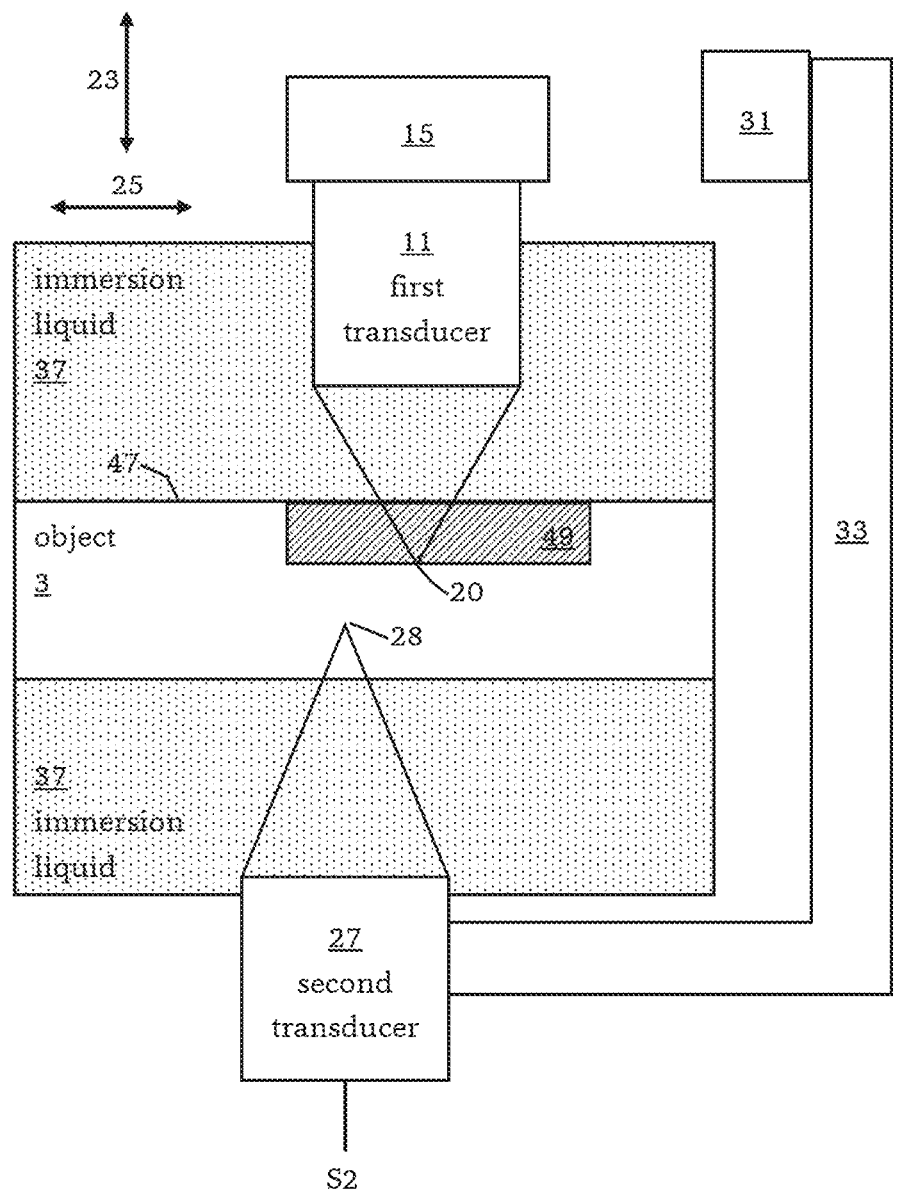

More details of the configuration of the controller 43 are described with reference to FIG. 4. In the situation illustrated in FIG. 4, the focal point 20 generated by the first transducer 11 and the focal point 28 of the second transducer 27 are displaced relative to each other in the lateral direction 25 and the vertical direction 23. The highest accuracy for inspecting the object 3 is obtained when both focal points coincide. In order to bring both focal points into coincidence, the controller 43 may be configured to control the second actuator 15 based on the second detection signal S2 output by the second transducer 27. As described above, the second actuator 15 is configured to move the first transducer 11 relative to the scan head 9 in the lateral direction 25. Therefore, the second actuator 15 can move the first transducer 11 and, thus, the focal point 20 of the first transducer 11 in the lateral direction 25 so that the displacement between the focal points 20 and 28 along the lateral direction is minimized. Accordingly, the controller 43 may be configured to control the second actuator 15 so that the first transducer 11 is aligned with the second transducer 27 along the lateral direction 25. In particular, this may be achieved in that the controller 43 is configured to control the second actuator 15 so that an intensity of the second detection signal S2 is maximized. By maximizing the intensity of the second detection signal S2, the displacement between the focal points 20 and 28 in the lateral direction 25 is minimized.

Further, the controller 43 may be configured to control the third actuator 31 based on the second detection signal S2 in order to minimize the displacement between the focal points 20 and 28 in the vertical direction 23. For example, this may be achieved in that the controller 43 is configured to control the third actuator 31 so that an intensity of the second detection signal S2 is maximized. By maximizing the intensity of the second detection signal S2, the displacement between the focal points 20 and 28 in the vertical direction is minimized.

Figure 5:
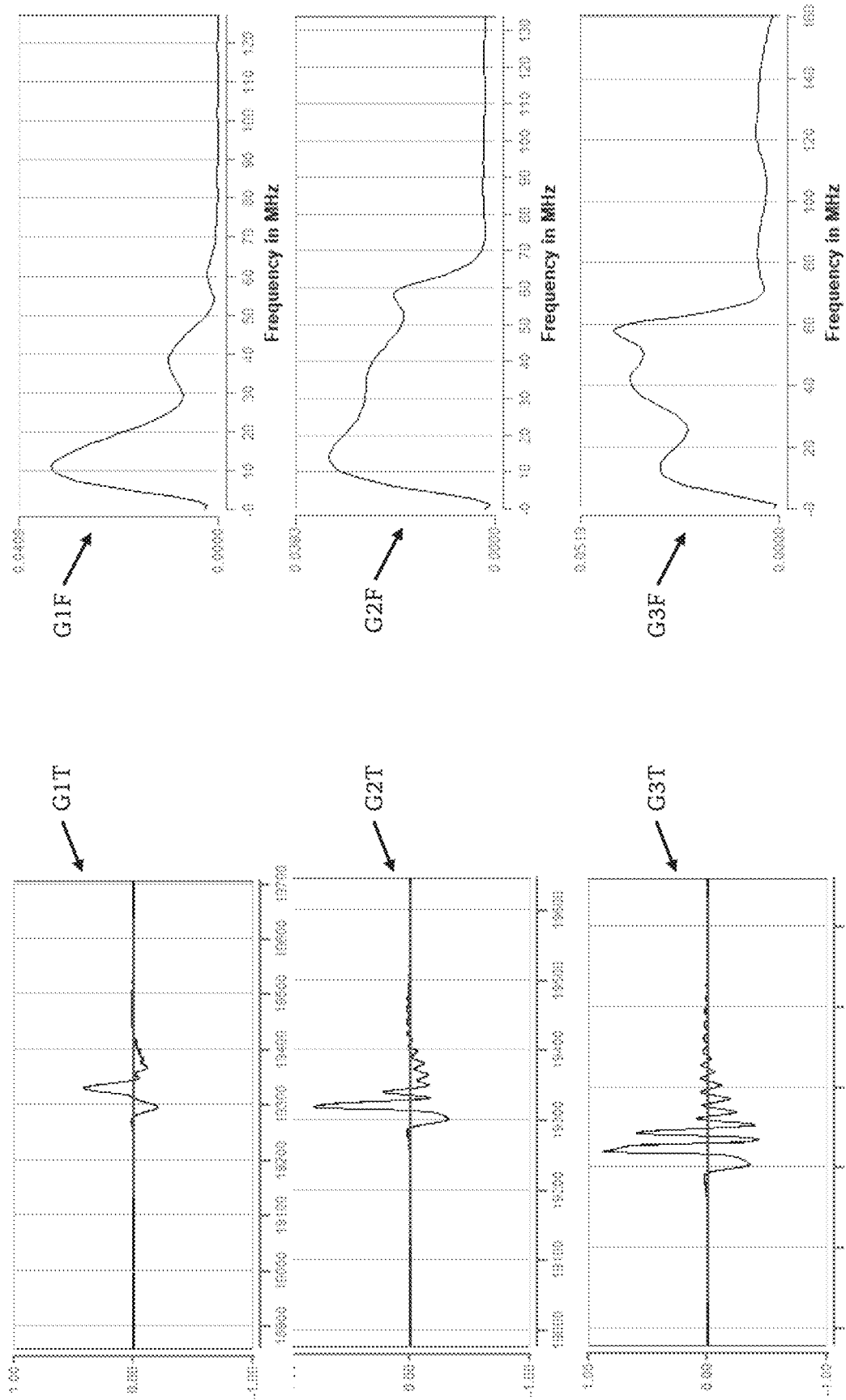
FIG. 5 illustrates exemplary time-domain and frequency-domain signals used for the alignment of the focal points.

Referring to FIG. 5, alignment of the first transducer 11 and the second transducer 27 relative to each other and alignment of the focal points 20 and 28 relative to each other as performed by the controller based on the second detection signal S2 is explained in more detail.

Graph G1T illustrates an exemplary representation of the second detection signal S2 in the time-domain when the first transducer 11 and the second transducer 27 are aligned badly, i.e. when the focal points 20 and 28 are far from coinciding. Graph G1F shows a frequency-domain representation of the signal illustrated in graph G1T.

Graph G2T illustrates an exemplary representation of the second detection signal S2 in the time-domain when the first transducer 11 and the second transducer 27 are aligned mediocrely, i.e. when the focal points 20 and 28 are in proximity to each other, e.g. separated by 100 µm. Graph G2F shows a frequency-domain representation of the signal illustrated in graph G2T.

Graph G3T illustrates an exemplary representation of the second detection signal S2 in the time-domain when the first transducer 11 and the second transducer 27 are well aligned, i.e. when the focal points 20 and 28 essentially coincide. Graph G3F shows a frequency-domain representation of the signal illustrated in graph G3T.

The second detection signal S2 in the time-domain (graphs G1T, G2T, G3T), in particular its maximum value, intensity value and the like, may be used as a quantity representing the quality of the alignment of the focal points 20 and 28. However, a quantified interpretation of the quantity may be difficult to achieve so that the time-domain signals are best used for a coarse alignment. The second detection signal S2 in the frequency domain (graphs G1F, G2F, G3F), in particular its amplitude spectrum (e.g. components at 30 to 80 MHz) and bandwidth, may allow for a more precise and simpler interpretation. As can be understood from the graphs G1F, G2F, G3F, the bandwidth of the second detection signal S2 in the frequency domain increases as the alignment improves. Also, the amplitudes of higher frequency components (e.g. components at 30 to 80 MHz) of the second detection signal S2 in the frequency domain increase as the alignment improves. Therefore, the frequency-domain signals are best used for a fine alignment.

Referring again to FIG. 1, the controller 43 may be further configured to control the fourth actuator 41 so that the object 3 can be variably positioned relative to the focal point 20 in the vertical direction 23. Accordingly, the object 3 can be displaced relative to the focal point 20 by controlling the fourth actuator 41.

Figure 6:
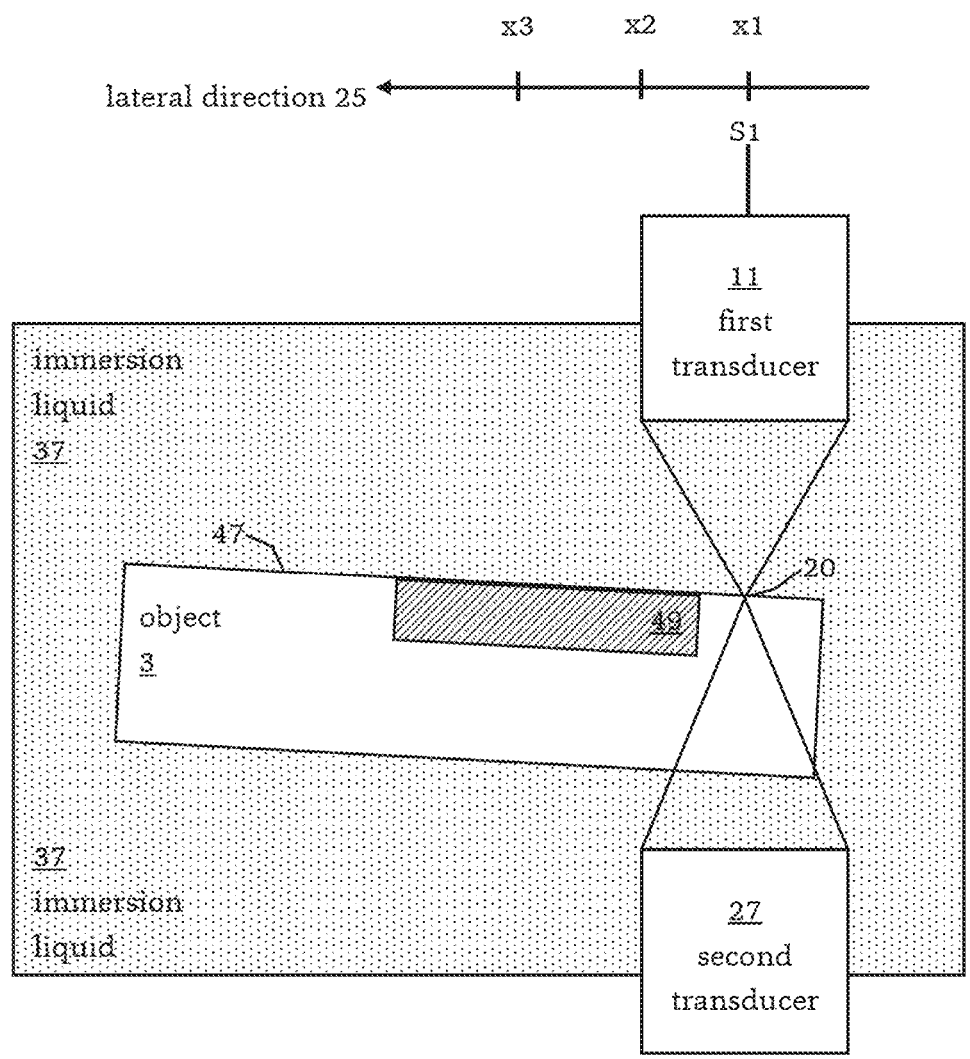
FIG. 6 illustrates an example of controlling a first actuator of the ultrasonic microscope, FIG. 7 schematically illustrates an ultrasonic microscope according to a second embodiment, FIG. 8 schematically illustrates an ultrasonic microscope according to a third embodiment.

FIG. 6 illustrates another example of controlling the first actuator 13 of the ultrasonic microscope 1. As described above, the scan-head positioning device 45 is configured to move the scan head 9 relative to the object holder 5 in the lateral plane/lateral direction 25. The controller 43 is accordingly configured to control the scan-head positioning device 45 to move the scan head 9, and thus the first transducer 11, to a plurality of positions x1, x2 and x3 one after another. As illustrated in FIG. 6, the surface 47 of the objects 3 may not be oriented parallel to the lateral direction 25. If the surface 47 of the object 3 is to be analyzed, during scanning of the object 3, i.e. during the movement of the first transducer 11 to the plurality of positions x1, x2 and x3, the focal point 20 of the first transducer 11 must be controlled to coincide with the surface 47 of the object 3 in order to achieve the desired accuracy.

By way of example illustrated in FIG. 6, the first transducer 11 is first positioned in the lateral direction 25 at the position x1 and the first actuator 13 is controlled so that the focal point 20 coincides with the surface 47 of the object 3. When the scan head 9 is positioned such that the first transducer 11 is positioned in the lateral direction 25 at position x1, the controller 43 causes the first transducer 11 to emit at least one of the first acoustic pulses, to detect at least one of the second acoustic pulses and to output the first detection signal S1. The controller 43 is further configured to store the first detection signal S1 or a value derived therefrom in association with the position x1 in the memory 51.

When proceeding the scanning, for example by moving the scan head 9 in the lateral direction 25 to move the first transducer 11 to the position x2, the first detection signals of values derived therefrom stored in the memory 51 may be used to control the first actuator 13. For example, it may be assumed that the first actuator 13 must be controlled, when the first transducer 11 is at the position x2, only slightly different compared to case when the first transducer 11 is at the position x1. Based on the first detection signal or the value derived therefrom stored in the memory 51, a prediction value for controlling the first actuator 13 at the next position x2 can be determined by the controller even before moving the first transducer 11 to the position x2.

After movement of the first transducer 11 to the position x2, the controller 43 causes the first transducer 11 to emit yet another first acoustic pulse, detect yet another second acoustic pulse and output yet another first detection signal S1. This detection signal or a value derived therefrom is stored in association with the position x2 in the memory 51.

Based on the first detection signals or the values derived therefrom stored in the memory 51, a new prediction value for controlling the first actuator 13 at the next position x3 can be determined by the controller even before moving the first transducer 11 to the position x3. The prediction value represents a value that approaches the actual value for controlling the first actuator 13 when the first transducer 11 is positioned at the position x3. However, the prediction value is calculated in advance, i.e. before the first transducer 11 is positioned at the position x3.

Figure 7:
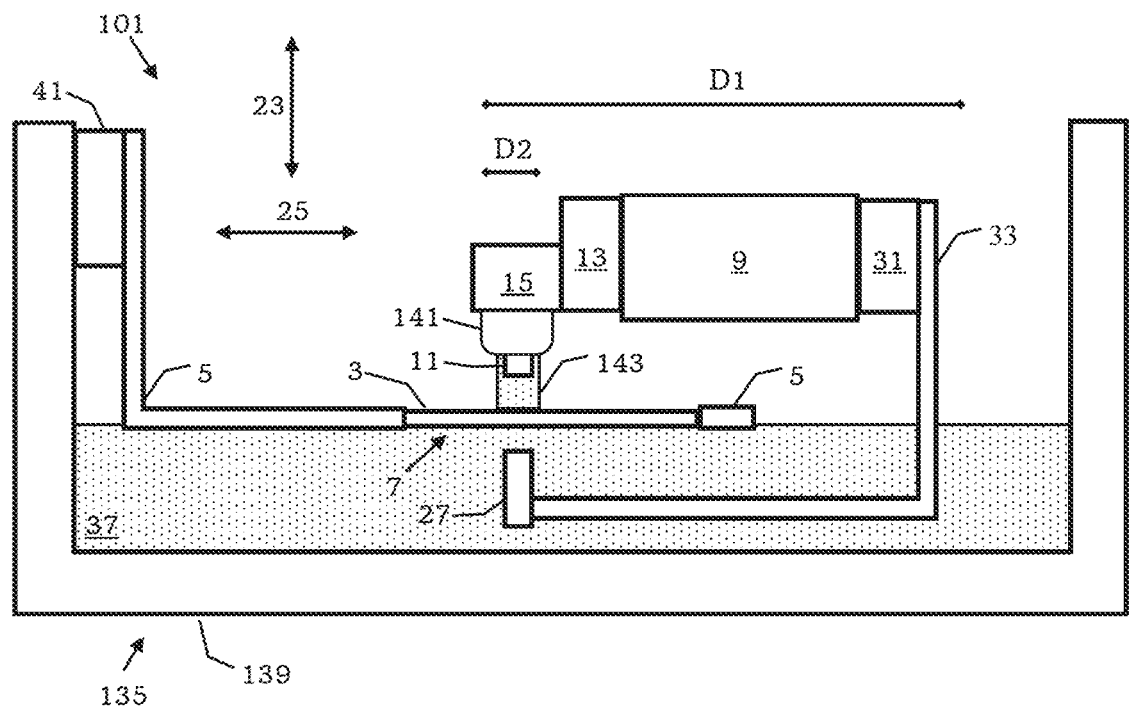

FIG. 7 illustrates a second embodiment of an ultrasonic microscope 101. The ultrasonic microscope 101 differs from the ultrasonic microscope 1 only in the configuration of the immersion apparatus. Therefore, reference is made to the description of the first embodiment with respect to components of the ultrasonic microscope 101 that are identical to those of the first embodiment. The ultrasonic microscope 101 comprises an immersion apparatus 135. The immersion apparatus 135 comprises a receptacle 139 which is similar to the receptacle 39 of the first embodiment. However, the receptacle 139 is configured and arranged so that the object region 7 is partially located within the volume defined by the receptacle 139 and filled with the immersion liquid 37.

The immersion apparatus 135 further comprises a jet generation device 141 configured to generate a first incessant jet 143 of the immersion liquid between the first transducer 11 and the object 3. Accordingly, the same effects as those presented for the first embodiment are also achieved with the second embodiment.

Figure 8:
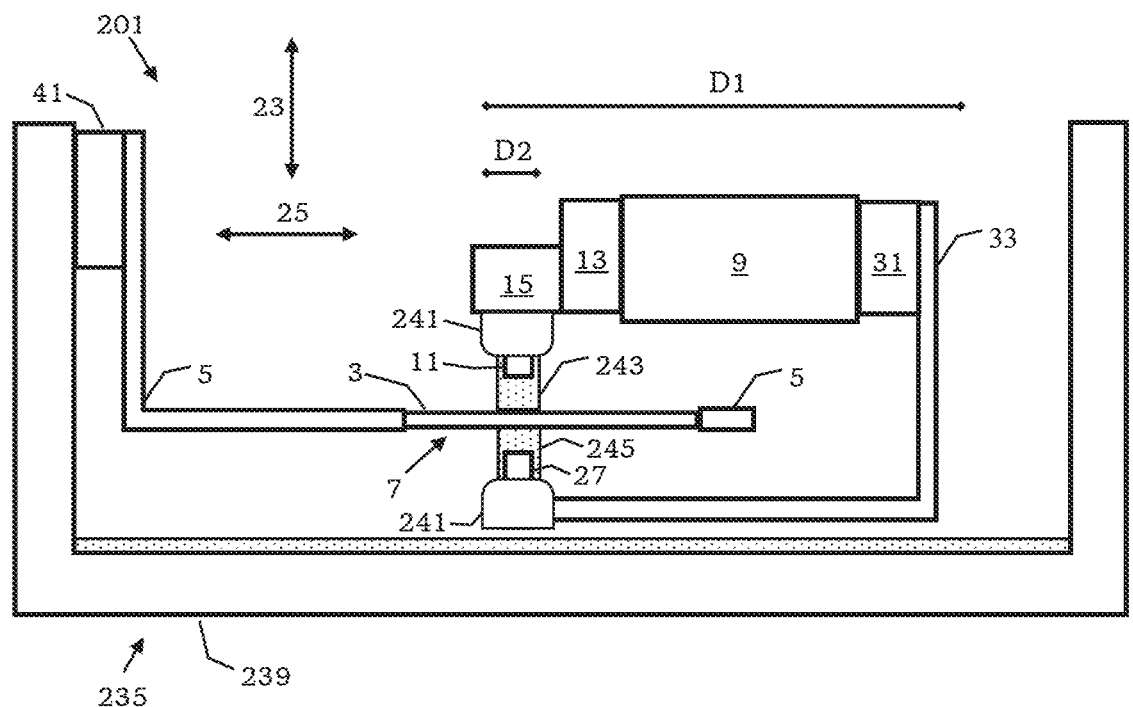

FIG. 8 illustrates a third embodiment of the present invention. FIG. 8 illustrates an ultrasonic microscope 201 which differs from the ultrasonic microscope 1 of the first embodiment only in the configuration of the immersion apparatus. Therefore, reference is made to the description of the first embodiment with respect to components of the ultrasonic microscope 201 that are identical to those of the first embodiment. The ultrasonic microscope 201 comprises an immersion apparatus 235 comprising a jet generation device 241 configured to generate a first incessant jet 243 of the immersion liquid between the first transducer 11 and the object 3 and to generate a second incessant jet 245 of the immersion liquid between the object 3 and the second transducer 27. The immersion apparatus 235 further comprises a receptacle 239 configured and arranged to hold the immersion liquid 37 output by the jet generation device 241. Accordingly, the same effects as those presented for the first embodiment are also achieved with the third embodiment.

Figure 9:
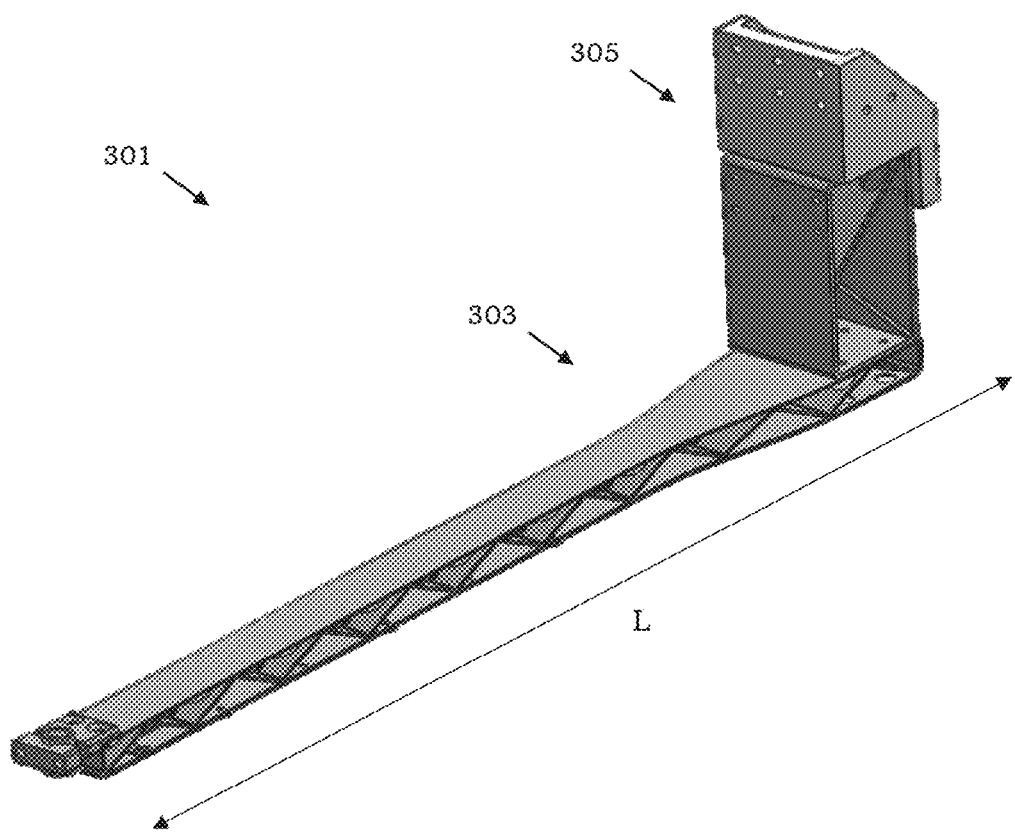
FIG. 9 illustrates a perspective view of a carrier for an ultrasonic microscope.

FIG. 9 illustrates a perspective view of a carrier 301 for carrying an acoustic pulse transducer of an ultrasonic microscope within an immersion liquid. The carrier 301 may be used as the carrier 33 illustrated in FIGS. 1, 6 and 7. Accordingly, the carrier 301 may be configured to carry the second transducer 27 for supporting the second transducer 27 by the scan head 9.

Figure 10:
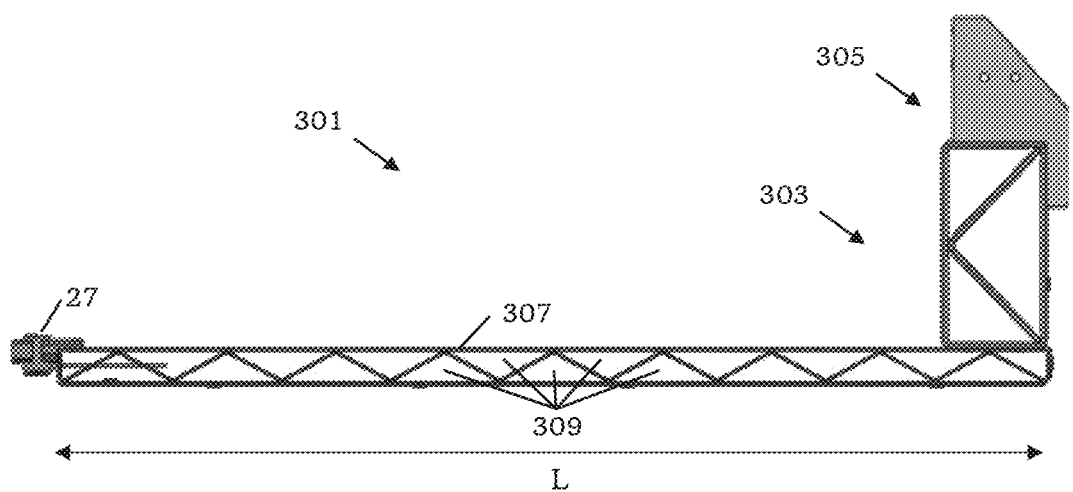
FIG. 10 illustrates a cross sectional view of the carrier of FIG. 9.

FIG. 10 illustrates a cross section of the carrier 301. The cross section may be defined to be orthogonal to a direction along which the carrier 301 is moved through the immersion liquid 37 when the scan head 9 is moved relative to the object holder 5.

The carrier 301 comprises a first portion 303 to be located within the immersion liquid 37 and a second portion 305 to be located outside the immersion liquid 37.

The first portion 303 comprises a solid structure 307 having openings 309 allowing the immersion liquid 37 to flow through the first portion 303. The faces of the first portion 303 may be characterized in terms of drag acting on the faces. For example, a total area of the openings 309 in the cross section illustrated in FIG. 10 may be represented by a first value wherein the total area of the solid structure 307 in the same cross section may be represented by a second value. The first portion 303 of the carrier 301, in particular the solid structure 307, may be constructed so that a ratio of the first value to the second value is greater than a particular threshold value. The greater the particular threshold value, the less drag acts on the carrier 301 when moved through the immersion liquid 37. The particular threshold value may be greater than 5, in particular greater than 10 or more in particular greater than 20.

Accordingly, drag on the first portion is minimized by the configuration of the solid structure 307.

A length L of the first portion 303 in the cross section may be between 10 cm and 1 m, in particular between 30 cm and 60 cm.

Further, the solid structure 307 may be shaped so that essentially no lift acts on the solid structure 307 when the first portion 303 is moved in the immersion liquid 37 in the direction orthogonal to the cross section illustrated in FIG. 10. Accordingly, the position of the focal point 28 of the second transducer 27 is not altered in the vertical direction 23 when the carrier 301 is moved relative to the object 3 in the immersion liquid 37.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

The invention claimed is:

1. An ultrasonic microscope for inspecting an object, wherein the ultrasonic microscope comprises:
   an object holder configured to hold the object in an object region;
   a scan head movable relative to the object region, the scan head movable in a lateral plane for scanning the object;

a first transducer supported by the scan head, wherein the first transducer is configured to emit first acoustic pulses along an emission direction and to focus the first acoustic pulses in a focal point, and wherein the first transducer is further configured to detect second acoustic pulses emerging from the object and to output a first acoustic detection signal representing the second acoustic pulses detected by the first transducer;

a first actuator configured to move the first transducer relative to the scan head along a vertical direction which is essentially parallel to the emission direction; and a controller configured to:

calculate a predicted value at a first position;

control, based on the predicted value of the first position, vertical movement of the first transducer relative to the scan head provided by the first actuator so that a predefined working distance is maintained between the first transducer and a surface of the object while the object is scanned and during lateral movement of the scan head based on the first acoustic detection signal or values derived from the first acoustic detection signal, wherein the predefined working distance is defined so that the distance between the surface of the object and the first transducer remains constant, and wherein the first actuator is controlled according to the predicted value at the first position in advance of the scan head being moved to a second position wherein the object has not yet been analyzed in the second position;

control emission of the first acoustic pulses by the first transducer;

determine a distance value representing a distance between the first transducer and a surface of the object based on the first detection signal;

generate a control signal to control the distance between the object and the first transducer so that a vertical distance between the object and the first transducer remains constant during scanning of the object and during lateral movement of the scan head; and control, by the control signal, the vertical movement of the first transducer relative to the object such that the distance between the first transducer and the surface of the object remains constant during scanning of the object and during lateral movement of the scan head.

2. The ultrasonic microscope according to claim 1, wherein the controller is further configured to:

determine a defocusing value representing a distance between the focal point and a location of interest of the object based on the determined distance value; and control the vertical movement of the first transducer relative to the scan head provided by the first actuator based on the defocusing value.

3. The ultrasonic microscope according to claim 1, further comprising:

a scan-head positioning device configured to move the scan head relative to the object holder in the lateral plane which is essentially orthogonal to the vertical direction.

4. The ultrasonic microscope according to claim 3, wherein the controller is further configured to:

control the scan-head positioning device so that the scan head is positioned at a plurality of positions;

perform, each time the scan head is positioned at one of the plurality of positions, causing the first transducer to emit at least one of the first acoustic pulses, detecting at least one of the second acoustic pulses and outputting the first detection signal;

store the first acoustic detection signal or the values derived from the first acoustic detection signal in association with the plurality of positions; and control the vertical movement of the first transducer relative to the scan head provided by the first actuator based on a set of the stored first detection signals or derived values to maintain the predefined working distance.

5. The ultrasonic microscope according to claim 1, further comprising:

a fourth actuator configured to move the object holder relative to the scan head along the vertical direction; and wherein the controller is further configured to control the fourth actuator so that the object can be variably positioned relative to the focal point in the vertical direction.

6. The ultrasonic microscope according to claim 3, further comprising:

a second actuator configured to move the first transducer relative to the scan head along a lateral direction which is essentially orthogonal to the vertical direction;

wherein the scan-head positioning device is configured to displace the scan head at most by a first displacement value;

wherein the second actuator is configured to displace the first transducer relative to the scan head at most by a second displacement value; and wherein a ratio of the first displacement value to the second displacement value is at least 10.

7. The ultrasonic microscope according to claim 1, wherein the first transducer is disposed above the object region.

8. The ultrasonic microscope according to claim 1, wherein the first transducer is configured to emit the first acoustic pulses so that the first acoustic pulses have an acoustic frequency above a threshold frequency, wherein the threshold frequency is selected from a group of threshold frequencies and the group of threshold frequencies comprises IO MHz and 15 MHz.

9. The ultrasonic microscope according to claim 1, wherein the controller is further configured to determine a height profile in a reference system of the first transducer based on the distance value, wherein the height profile in the reference system of the first transducer is transformed into a reference system of the scan head, wherein information about a vertical position of the first transducer in the reference system of the scan head is used, wherein the information about the vertical position of the first transducer relative to the scan head is obtained from the control signal supplied to the first actuator from the controller, wherein the control signal represents the vertical movement to be performed by the first actuator.

10. An ultrasonic microscope for inspecting an object wherein the ultrasonic microscope comprises:

an object holder configured to hold the object in an object region;

a scan head movable relative to the object region, the scan head movable in a lateral plane for scanning the object a first transducer supported by the scan head, wherein the first transducer is configured to emit first acoustic pulses along an emission direction and to focus the first acoustic pulses in a first focal point, and wherein the first transducer is further configured to detect second acoustic pulses emerging from the object and to output a first acoustic detection signal representing the second acoustic pulses detected by the first transducer;

a first actuator configured to move the first transducer relative to the scan head along a vertical direction which is essentially parallel to the emission direction;

a controller configured to:

calculate a predicted value at a first position; and control, based on the predicted value of the first position, vertical movement of the first transducer relative to the scan head provided by the first actuator so that a predefined working distance is maintained between the first transducer and a surface of the object while the object is scanned and during lateral movement of the scan head based on the first acoustic detection signal or values derived from the first acoustic detection signal, wherein the predefined working distance is defined so that the distance between the surface of the object and the first transducer remains constant, and wherein the first actuator is controlled according to the predicted value at the first position in advance of the scan head being moved to a second position wherein the object has not yet been analyzed in the second position; and a second transducer supported by the scan head so that the object region is located between the first transducer and the second transducer, wherein the second transducer is configured to detect the second acoustic pulses emerging from the object and to output a second acoustic detection signal representing the second acoustic pulses detected by the second transducer, wherein the controller is configured to:

align the first focal point of the first transducer with a second focal point of the second transducer;

determine a distance value representing a distance between the first transducer and a surface of the object based on the first detection signal, generate a control signal to control the distance between the object and the first transducer so that a vertical distance between the object and the first transducer remains constant during scanning of the object and during lateral movement of the scan head; and control, by the control signal, the vertical movement of the first and second transducers relative to the scan head such that the distance between the first transducer and the surface of the object remains constant and the first and second focal points of the first and second transducers, respectively, are aligned during scanning of the object and during lateral movement of the scan head.

11. The ultrasonic microscope according to claim 10, further comprising:

a second actuator configured to move the first transducer relative to the scan head along the lateral direction which is essentially orthogonal to the vertical direction; and wherein the controller is further configured to control lateral movement of the first transducer relative to the scan head provided by the second actuator based on the second detection signal.

12. The ultrasonic microscope according to claim 11, wherein the controller is configured to control the lateral movement of the first transducer relative to the scan head provided by the second actuator so that the first transducer is aligned with the second transducer along the lateral direction.

13. The ultrasonic microscope according to claim 12, wherein the controller is configured to control the lateral movement of the first transducer relative to the scan head provided by the second actuator so that an intensity of the second acoustic detection signal is maximized.

14. The ultrasonic microscope according to claim 12, wherein the controller is configured to calculate a frequency-domain representation of the second acoustic detection signal and to control the lateral movement of the first transducer relative to the scan head provided by the second actuator based on the frequency-domain representation of the second detection signal.

15. The ultrasonic microscope according to claim 10, further comprising:

a third actuator configured to move the second transducer relative to the scan head along the vertical direction.

16. The ultrasonic microscope according to claim 15, wherein the controller is further configured to control vertical movement of the second transducer relative to the scan head provided by the third actuator based on the first detection signal.

17. The ultrasonic microscope according to claim 16, wherein the controller is further configured to control vertical movement of the second transducer relative to the scan head provided by the third actuator based on the control signal.

18. The ultrasonic microscope according to claim 15, wherein the controller is further configured to control vertical movement of the second transducer relative to the scan head provided by the third actuator based on the second detection signal.

19. The ultrasonic microscope according to claim 18, wherein the controller is configured to control the vertical movement of the second transducer relative to the scan head provided by the third actuator so that an intensity of the second acoustic detection signal is maximized.

20. The ultrasonic microscope according to claim 18, wherein the controller is configured to calculate a frequency-domain representation of the second acoustic detection signal and to control the vertical movement of the second transducer relative to the scan head provided by the third actuator based on the frequency-domain representation of the second detection signal.

21. The ultrasonic microscope according to claim 10, further comprising:

a scan-head positioning device configured to move the scan head relative to the object holder in the lateral plane which is essentially orthogonal to the vertical direction.

22. The ultrasonic microscope according to claim 10, further comprising:

a fourth actuator configured to move the object holder relative to the scan head along the vertical direction; and wherein the controller is further configured to control the fourth actuator so that the object can be variably positioned relative to the first and second focal points in the vertical direction.

23. The ultrasonic microscope according to claim 10, wherein the first transducer is disposed above the object region.

24. The ultrasonic microscope according to claim 10, wherein the first transducer is configured to emit the first acoustic pulses so that the first acoustic pulses have an acoustic frequency above a threshold frequency, wherein the threshold frequency is selected from a group of threshold frequencies and the group of threshold frequencies comprises IO MHz and 15 MHz.

25. The ultrasonic microscope according to claim 10, wherein the controller is further configured to determine a height profile in a reference system of the first transducer based on the distance value, wherein the height profile in the reference system of the first transducer is transformed into a reference system of the scan head, wherein information about a vertical position of the first transducer in the reference system of the scan head is used, wherein the information about the vertical position of the first transducer relative to the scan head is obtained from the control signal supplied to the first actuator from the controller, wherein the control signal represents the vertical movement to be performed by the first actuator.

* * * * *